United States Patent
Kim et al.

(10) Patent No.: US 9,214,996 B2
(45) Date of Patent: Dec. 15, 2015

(54) METHOD OF RECEIVING OR TRANSMITTING DOWNLINK SIGNAL IN WIRELESS COMMUNICATION SYSTEM AND DEVICE FOR PERFORMING THE METHOD

(71) Applicant: LG ELECTRONICS INC., Seoul (KR)

(72) Inventors: Youngtae Kim, Anyang-si (KR); Kijun Kim, Anyang-si (KR); Jonghyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/408,866

(22) PCT Filed: Jul. 8, 2013

(86) PCT No.: PCT/KR2013/006040
§ 371 (c)(1),
(2) Date: Dec. 17, 2014

(87) PCT Pub. No.: WO2014/007591
PCT Pub. Date: Jan. 9, 2014

(65) Prior Publication Data
US 2015/0195024 A1 Jul. 9, 2015

Related U.S. Application Data

(60) Provisional application No. 61/668,451, filed on Jul. 6, 2012.

(51) Int. Cl.
*H04L 27/00* (2006.01)
*H04B 7/06* (2006.01)
*H04B 7/04* (2006.01)

(52) U.S. Cl.
CPC ............ *H04B 7/0608* (2013.01); *H04B 7/0456* (2013.01); *H04B 7/0639* (2013.01)

(58) Field of Classification Search
CPC .. H04B 7/0608; H04B 7/0456; H04B 7/0482; H04B 7/061; H04B 7/0639
See application file for complete search history.

(56) References Cited

U.S. PATENT DOCUMENTS

| | | | |
|---|---|---|---|
| 2008/0205533 A1* | 8/2008 | Lee et al. ............. | H04B 7/0671 375/260 |
| 2011/0019613 A1* | 1/2011 | Han et al. ............. | H04B 7/0639 370/328 |

(Continued)

FOREIGN PATENT DOCUMENTS

| | | |
|---|---|---|
| KR | 10-2008-0032311 | 4/2008 |
| KR | 10-2008-0066628 | 7/2008 |

(Continued)

OTHER PUBLICATIONS

PCT International Application No. PCT/KR2013/006040, Written Opinion of the International Searching Authority dated Oct. 18, 2013, 12 pages.

(Continued)

*Primary Examiner* — Syed Haider
(74) *Attorney, Agent, or Firm* — Lee, Hong, Degerman, Kang & Waimey

(57) ABSTRACT

A method of receiving a downlink signal by a terminal in a wireless communication system according to an embodiment of the present invention includes: transmitting, to a serving base station, an antenna selection index for selecting M of N antennas (where N>M and both N and M are positive integers) in a specific base station and a pre-coding matrix indicator PMI suitable for the M antennas; and receiving, from the specific base station, the downlink signal on which pre-coding is performed by using a pre-coding determined based on the antenna selection index and the pre-coding matrix indicator, wherein the antenna selection index may indicate any one of the antenna selection vectors that belong to an antenna selection codebook consisting of all the antenna selection vectors or a subset of all the antenna selection vectors for selecting at least one of the N antennas in the specific base station.

10 Claims, 11 Drawing Sheets

(56) References Cited

U.S. PATENT DOCUMENTS

2011/0085618 A1* 4/2011 Zhuang et al. ........ H04L 25/021
375/296
2013/0114425 A1* 5/2013 Sayana et al. ................. 370/252
2014/0086353 A1* 3/2014 Ni et al. ......................... 375/267

FOREIGN PATENT DOCUMENTS

| KR | 10-2009-0017352 | 2/2009 |
| KR | 10-2009-0073758 | 7/2009 |
| KR | 10-2009-0083834 | 8/2009 |
| WO | WO 2011157182 A2 * | 12/2011 |

OTHER PUBLICATIONS

PCT International Application No. PCT/KR2013/006040, Written Opinion of the International Searching Authority dated Oct. 18, 2013, 16 pages.

* cited by examiner (a)

(b)

METHOD OF RECEIVING OR TRANSMITTING DOWNLINK SIGNAL IN WIRELESS COMMUNICATION SYSTEM AND DEVICE FOR PERFORMING THE METHOD

CROSS-REFERENCE TO RELATED APPLICATIONS

This application is the National Stage filing under 35 U.S.C. 371 of International Application No. PCT/KR2013/006040, filed on Jul. 8, 2013, which claims the benefit of U.S. Provisional Application Ser. No. 61/668,451, filed on Jul. 6, 2012, the contents of which are all hereby incorporated by reference herein in their entirety.

TECHNICAL FIELD

The present invention relates to a wireless communication system, and more particularly, to a method and apparatus for receiving or transmitting a downlink signal in a wireless communication system.

BACKGROUND

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for effectively receiving or transmitting a downlink signal in a wireless communication system.

In addition, another object of the present invention devised to solve the problem lies in a method for providing flexibility for predefined codebook-based precoding in an LTE(-A) system.

It is to be understood that both the foregoing general description and the following detailed description of the present invention are exemplary and explanatory and are intended to provide further explanation of the invention as claimed.

Technical Solution

The object of the present invention can be achieved by providing a method for receiving a downlink signal by a user equipment (UE) in a wireless communication system, the method including transmitting an antenna selection index for selecting M antennas among N antennas (N>M and both N and M are positive integers) of a specific base station (BS) and a precoding matrix indicator (PMI) appropriate for the M antennas to a serving BS, and receiving downlink signal which is precoded using a precoding matrix determined based on the antenna selection index and the PMI, from the specific BS, wherein the antenna selection index indicates one of all antenna selection vectors for selecting at least one antenna among the N antennas of the specific BS or an antenna selection vector included in an antenna selection codebook comprised of subsets of the all antenna selection vectors.

Preferably, the transmitting may include transmitting PMI appropriate for the N antennas to the serving BS.

Preferably, when M is a divisor of N, the proceeding matrix (PM$_{new}$) may be determined according to PM$_{new}$=A1×PM1, where A$_1$ may be a matrix obtained by removing columns of zero (0) vectors from diag(a), diag(a) may be a diagonal matrix having elements of antenna selection vector (a) indicated by the antenna selection index as diagonal elements, and PM$_1$ may be a precoding matrix indicated by the PMI appropriate for the M antennas.

Preferably, when M is not a divisor of N, the proceeding matrix (PM$_{new}$) may be determined according to PM$_{new}$=M× A$_2$×PM$_2$, where A$_2$ may be diag(a), diag(a) may be a diagonal matrix having elements of antenna selection vector (a) indicated by the antenna selection index as diagonal elements, PM$_2$ may be a precoding matrix indicated by the PMI appropriate for the M antennas, and M may be a normalization value.

Preferably, $$M = \sqrt{\frac{E\{tr(PM_2^H \times PM_2)\}}{E\{tr(PM_2^H \times A_2^H \times A_2 \times PM_2)\}}},$$

where E{ } may be an average value, tr( ) may be the sum of diagonal elements, and $^H$ may be Hermit matrix.

In another aspect of the present invention, provided herein is a method for transmitting a downlink signal by a base station (BS) in a wireless communication system, the method including receiving an antenna selection index for selecting M antennas among N antennas (N>M and both N and M are positive integers) of the BS and a precoding matrix indicator (PMI) appropriate for the M antennas from a user equipment (UE) or another BS, determining a precoding matrix based on the antenna selection index and the PMI, and transmitting downlink signal precoded using the determined precoding matrix to the UE, wherein the antenna selection index indicates one of all antenna selection vectors for selecting at least one antenna among the N antennas of the BS or an antenna selection vector included in an antenna selection codebook comprised of subsets of the all antenna selection vectors.

Preferably, the receiving may include receiving PMI appropriate for the N antennas from the UE or the another BS.

Preferably, when M is a divisor of N, the proceeding matrix (PM$_{new}$) may be determined according to PM$_{new}$=A$_1$×PM$_1$, where A$_1$ may be a matrix obtained by removing columns of zero (0) vectors from diag(a), diag(a) may be a diagonal matrix having elements of antenna selection vector (a) indicated by the antenna selection index as diagonal elements, and PM$_1$ may be a precoding matrix indicated by the PMI appropriate for the M antennas.

Preferably, when M is not a divisor of N, the proceeding matrix (PM$_{new}$) may be determined according to PM$_{new}$=M× A$_2$×PM$_2$, where A$_2$ may be diag(a), diag(a) may be a diagonal matrix having elements of antenna selection vector (a) indicated by the antenna selection index as diagonal elements, PM$_2$ may be a precoding matrix indicated by the PMI appropriate for the M antennas, and M may be a normalization value.

Preferably, $$M = \sqrt{\frac{E\{tr(PM_2^H \times PM_2)\}}{E\{tr(PM_2^H \times A_2^H \times A_2 \times PM_2)\}}},$$

where E{ } may be an average value, tr( ) may be the sum of diagonal elements, and $^H$ may be Hermit matrix.

In another aspect of the present invention, provided herein is a user equipment (UE) configured to receive a downlink signal in a wireless communication system, the UE including a radio frequency (RF) unit, and a processor configured to control the RF unit, wherein the processor may be configured to transmit an antenna selection index for selecting M antennas among N antennas (N>M and both N and M are positive integers) of a specific base station (BS) and a precoding matrix indicator (PMI) appropriate for the M antennas to a serving BS, and to receive downlink signal precoded using a precoding matrix determined based on the antenna selection index and the PMI, from the specific BS; and the antenna selection index indicates one of all antenna selection vectors for selection of at least one antenna among the N antennas of the specific BS or an antenna selection vector included in an antenna selection codebook comprised of subsets of the all antenna selection vectors.

In another aspect of the present invention, provided herein is a base station (BS) configured to receive a downlink signal in a wireless communication system, the BS including a radio frequency (RF) unit, and a processor configured to control the RF unit, wherein the processor is configured to receive an antenna selection index for selecting M antennas among N antennas (N>M and both N and M are positive integers) of the BS and a precoding matrix indicator (PMI) appropriate for the M antennas from a user equipment (UE) or another BS, to determine a precoding matrix based on the antenna selection index and the PMI, and to transmit downlink signal precoded using the determined precoding matrix to the UE, and the antenna selection index indicates one of all antenna selection vectors for selection of at least one antenna among the N antennas of the BS or an antenna selection vector included in an antenna selection codebook comprised subsets of the all antenna selection vectors.

It is to be understood that both the foregoing general description and the following detailed description of the present invention are exemplary and explanatory and are intended to provide further explanation of the invention as claimed.

Advantageous Effects

According to an embodiment of the present invention, a downlink signal may be effectively received or transmitted in a wireless communication system.

In addition, the present invention may provide flexibility for predefined codebook-based precoding in an LTE(-A) system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
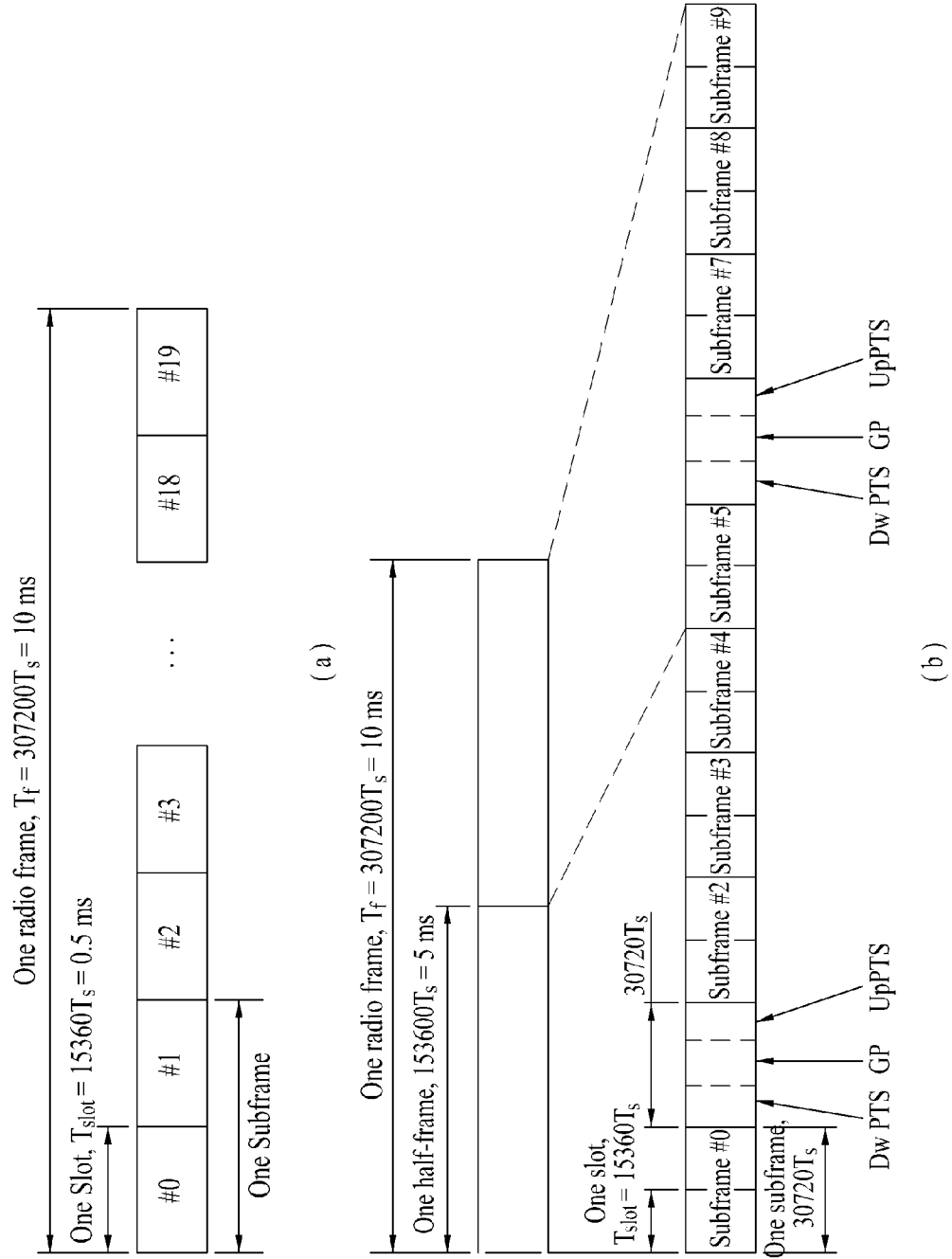
FIG. 1 is a diagram illustrating an example of a configuration of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RSs on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
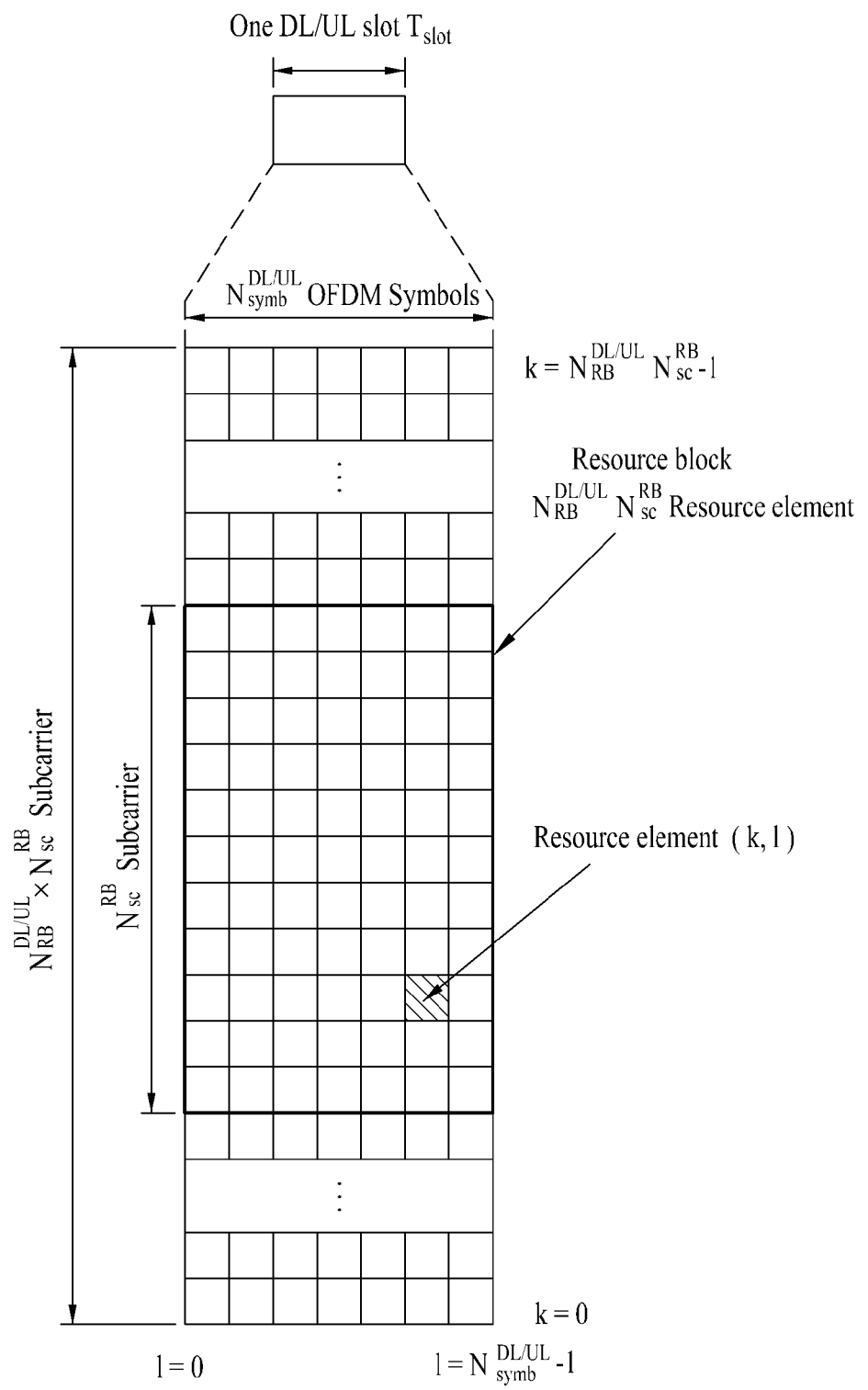
FIG. 2 is a diagram illustrating a configuration of a downlink/uplink (DL/UL) slot in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $H_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL} - 1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs thorugh interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
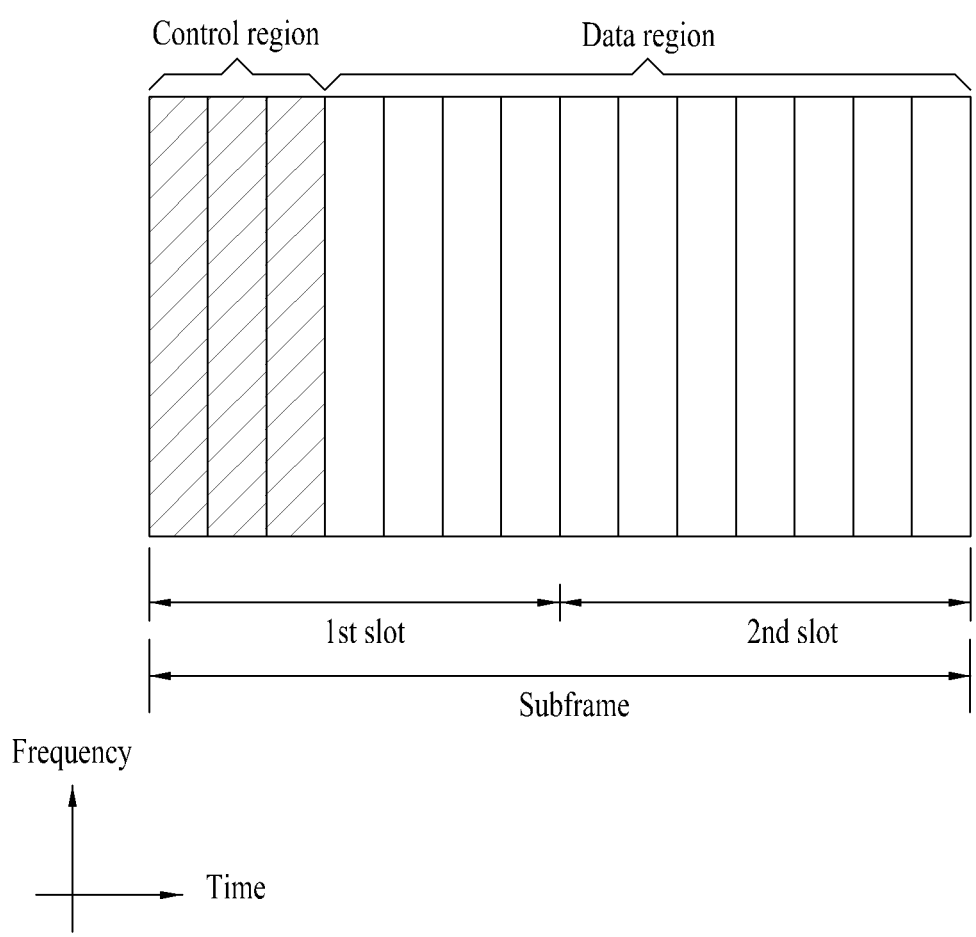
FIG. 3 is a diagram illustrating a configuration of a downlink (DL) subframe used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

Search Space

| Type | Aggregation Level L | Size [in CCEs] | Number of PDCCH candidates $M^{(L)}$ |
| --- | --- | --- | --- |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
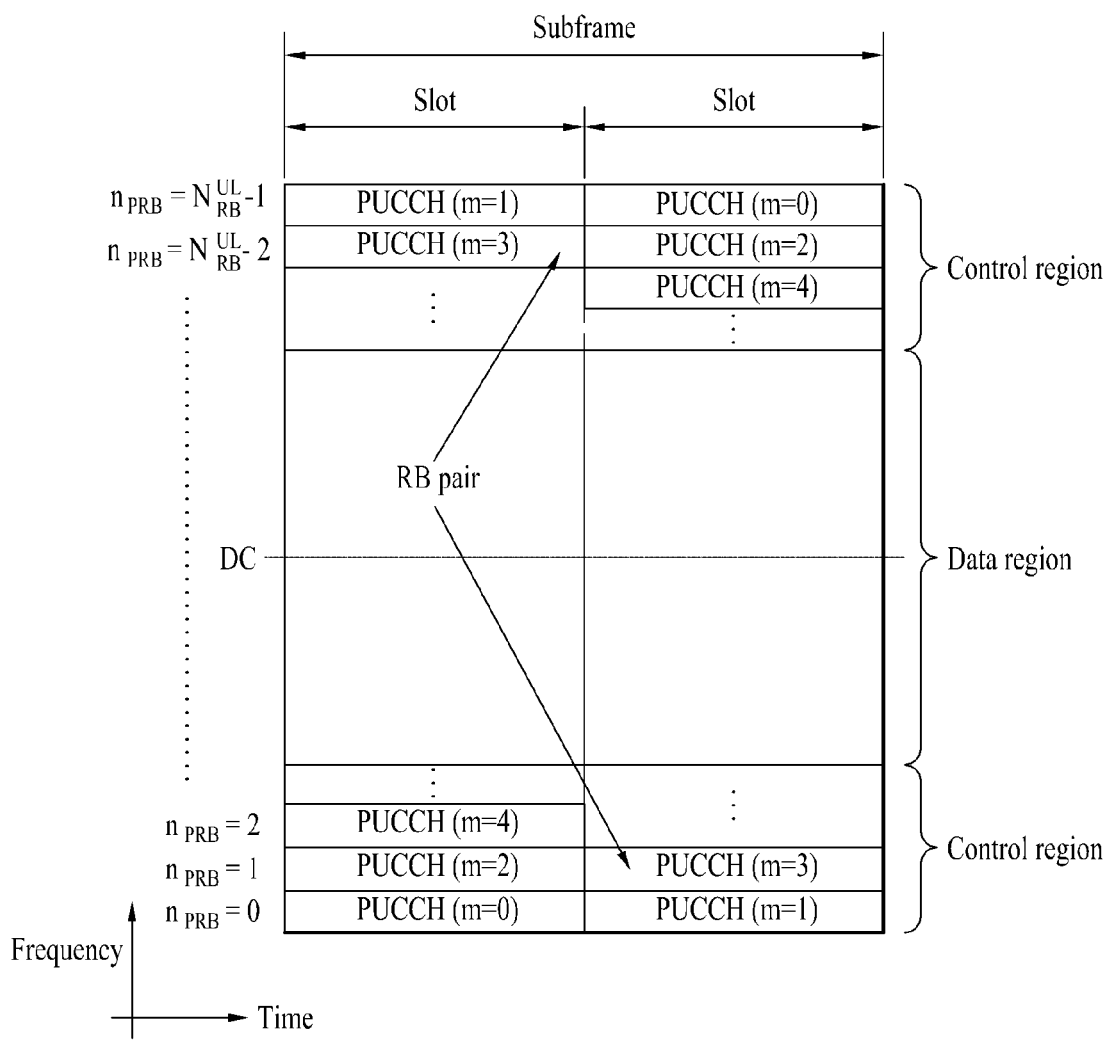
FIG. 4 is a diagram illustrating an example of a configuration of an uplink (UL) subframe used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Figure 5:
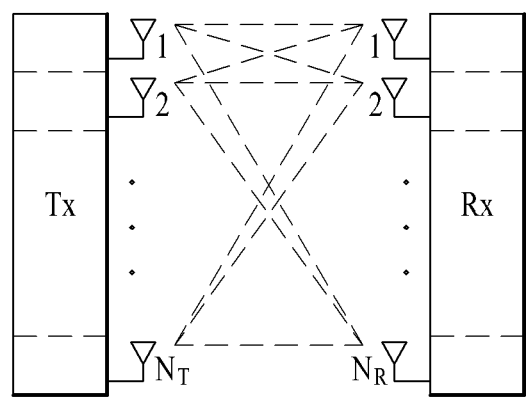
FIG. 5 is a block diagram of multi-input multi-output (MIMO) used in a 3GPP LTE/LTE-A system.
Figure 5:
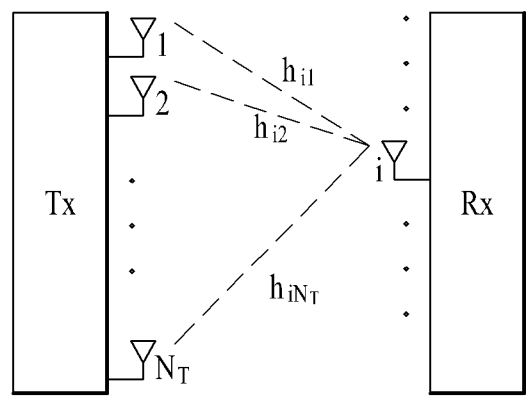

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$, illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector ŝ may be expressed as follows, using a diagonal matrix P of transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5. Herein, $w_{ij}$ denotes a weight between an ith Tx antenna and a jth piece of information. W is called a weight matrix or a precoding matrix.

$$x = \begin{bmatrix} x_1 \\ x_2 \\ \vdots \\ x_i \\ \vdots \\ x_{N_T} \end{bmatrix}$$ [Equation 5]

$$= \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Here, $W_{ij}$ denotes a weight between an i-th Tx antenna and j-th information. W is also called a precoding matrix.

Given $N_R$ Rx antennas, signals received at the respective Rx antennas, $y_1, y_2, y_{N_R}$ may be represented as the following vector.

$$y = [y_1, y_2, \ldots, y_{N_R}]^T$$ [Equation 6]

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}]$$ [Equation 7]

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

Actual channels experience the above channel matrix H and then are added with Additive white Gaussian noise (AWGN). The AWGN $n_1, n_2, \ldots, n_{N_R}$ added to the $N_R$ Rx antennas is given as the following vector.

$$n = [n_1, n_2, \ldots, n_{N_R}]^T$$ [Equation 9]

From the above modeled equations, the received signal is given as $$y = \begin{bmatrix} y_1 \\ y_2 \\ \vdots \\ y_i \\ \vdots \\ y_{N_R} \end{bmatrix}$$ [Equation 10]

$$= \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R)$$ [Equation b 11]

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

Codebook Based Precoding Scheme

A precoding scheme for appropriately distributing transmission information according to the channel states of antennas is applicable in order to support MIMO transmission. A codebook based precoding scheme refers to a scheme for predetermining a set of precoding matrices between a transmitter and a receiver, measuring channel information from the transmitter at the receiver, feeding a suitable precoding matrix (that is, a precoding matrix index (PMI)) back to the transmitter and applying the suitable precoding matrix to signal transmission at the transmitter. Since a suitable precoding matrix is selected from the predetermined set of precoding matrices, an optimal precoding matrix may not always be applied but feedback overhead can be reduced as compared to explicit feedback of optimal precoding information in actual channel information.

Figure 6:
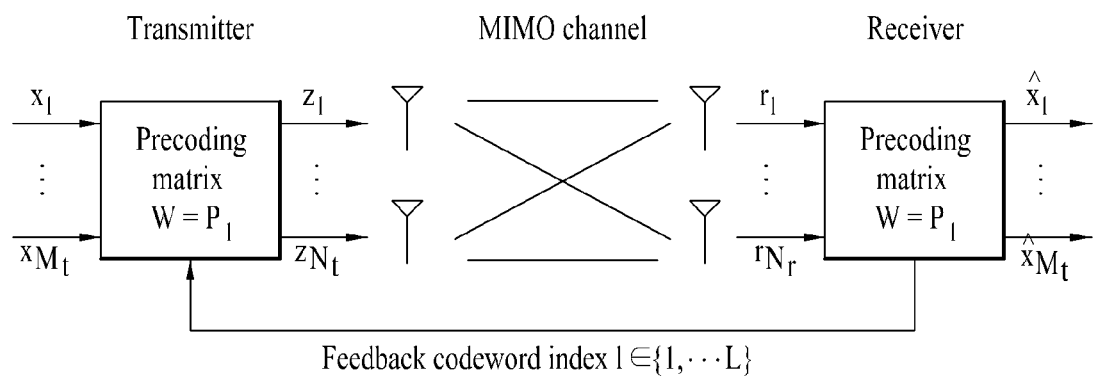
FIG. 6 is a diagram for explanation of a codebook-based precoding operation.

FIG. 6 is a diagram illustrating the basic concept of codebook based precoding.

In a codebook based precoding scheme, a transmitter and a receiver share codebook information including a predetermined number of precoding matrices predetermined according to transmission rank, number of antennas, etc. That is, if feedback information is finite, a precoding based codebook scheme may be used. The receiver may measure a channel state via a received signal and feed a finite number of pieces of preferred precoding matrix information (that is, the indices of the precoding matrices) back to the transmitter based on the above-described codebook information. For example, the receiver may measure the received signal using a maximum likelihood (ML) or minimum mean square error (MMSE) method and select an optimal precoding matrix. Although FIG. 6 shows the case in which the receiver transmits precoding matrix information on a per codeword basis, the present invention is not limited thereto.

The transmitter, which has received feedback information from the receiver, may select a specific precoding matrix from the codebook based on the received information. The transmitter, which has selected the precoding matrix, may perform precoding by multiplying layer signals corresponding in number to transmission rank by the selected precoding matrix and transmit the precoded signal via a plurality of antennas. In the precoding matrix, the number of rows is equal to the number of antennas and the number of columns is equal to the rank value. Since the rank value is equal to the number of layers, the number of columns is equal to the number of layers. For example, if the number of transmit antennas is 4 and the number of transmit layers is 2, a 4×2 precoding matrix may be configured. Information transmitted via the layers may be mapped to the antennas via the precoding matrix.

The receiver, which has received the signal precoded and transmitted by the transmitter, may perform an inverse process of precoding performed by the transmitter to restore a received signal. In general, the precoding matrix satisfies a unitary matrix (U) condition such as $U*U^H = I$ and the inverse process of precoding may be performed by multiplying a Hermitian matrix ($P^H$) of the precoding matrix P used for precoding of the transmitter by the received signal.

For example, Table 5 below shows a codebook used for downlink transmission using 2 transmit antennas in 3GPP LTE release-8/9 and Table 6 below shows a codebook used for downlink transmission using 4 transmit antennas in 3GPP LTE release-8/9.

TABLE 5

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 0\\j & -j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6 above, $W_n^{\{s\}}$ is obtained by a set $\{s\}$ composed of an equation $W_n = I - 2u_n u_n^H / u_n^H u_n$. At this time, I denotes a 4×4 unitary matrix and $u_n$ denotes a value given in Table 6.

As shown in Table 5 above, a codebook for 2 transmit antennas has a total of 7 precoding vectors/matrices. Since a unitary matrix is for an open-loop system, the total number of precoding vectors/matrices for precoding of a closed-loop system is 6. In addition, a codebook for 4 transmit antennas shown in Table 6 above has a total of 64 precoding vectors/matrices.

Such a codebook has common properties such as a constant modulus (CM) property, a nested property and a constrained alphabet property. The CM property means that elements of all precoding matrices in the codebook do not include "0" and have the same size. The nested property means that a precoding matrix having a low rank is designed to be composed of a subset of specific columns of a precoding matrix having a high rank. The constrained alphabet property means that the elements of all the precoding matrices in the codebook are constrained. For example, the elements of the precoding matrix may be constrained to only an element ±1 used for binary phase shift keying (BPSK), an element ±1,±j used for quadrature phase shift keying (QPSK) or an element $$\pm 1, \pm j, \pm \frac{(1+j)}{\sqrt{2}}, \pm \frac{(-1+j)}{\sqrt{2}}$$

used for 8-PSK. The example of the codebook of Table 5 above may have the constrained alphabet property since the letters of the elements of all the precoding matrices in the codebook are composed of $$\left\{\pm 1, \pm j, \pm \frac{(1+j)}{\sqrt{2}}, \pm \frac{(-1+j)}{\sqrt{2}}\right\}.$$

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

Figure 7:
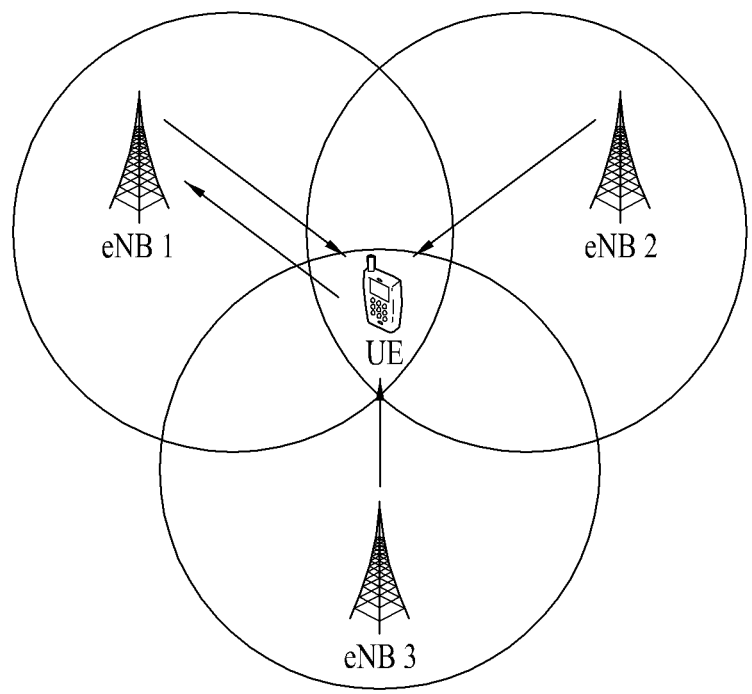
FIG. 7 is a diagram illustrating an example of a wireless communication system to which a coordinated multiple point transmission and reception (CoMP) operation is applied.

FIG. 7 illustrates an example of the joint transmission scheme.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

Overview of 3D-MIMO

Wireless communication systems following LTE Rel-12 consider introduction of an active antenna system (AAS). AAS refers to a system configured such that each antenna includes an active element such as an amplifier, distinguished from a conventional passive antenna system in which an amplifier capable of adjusting the phase and amplitude of a signal is separated from an antenna. The AAS does not need a cable, a connector, other hardware devices, etc. to connect an amplifier to an antenna since an active antenna is used, and thus the AAS is efficient in terms of energy and cost. Particularly, since the AAS supports electronic beam control per antenna, the AAS enables enhanced MIMO capable of forming an accurate beam pattern or a 3D beam pattern in consideration of beam direction and beam width.

Figure 8:
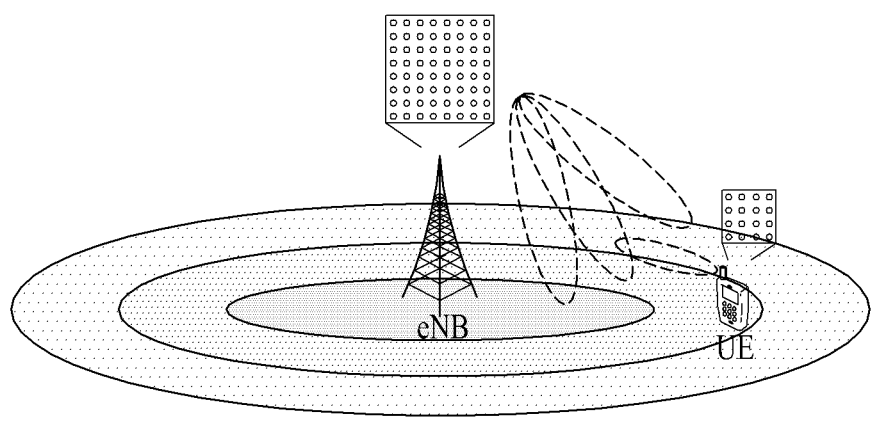
FIG. 8 is a diagram illustrating an example of a 3D-MIMO scheme.

Massive MIMO having a plurality of input/output antennas and a multi-dimensional antenna structure is also considered owing to introduction of an enhanced antenna system such as AAS. For example, a two-dimensional antenna array enables active antennas of an AAS to generate a 3-dimensional beam pattern. When the 3-dimensional beam pattern is used, a transmit antenna can perform quasi-static or dynamic beam formation in the vertical direction as well as the horizontal direction of a beam. For example, an application of formation of a sector in the vertical direction can be considered. From the viewpoint of a receive antenna, a signal power increase due to an antenna array gain can be expected when a reception beam is formed using a large-scale receive antenna. Accordingly, an eNB can receive a signal transmitted from a UE through a plurality of antennas on uplink and the UE can set transmit power thereof to a very low level in consideration of the gain of the large-scale receive antenna in order to reduce the influence of interference. FIG. 8 is a diagram illustrating a system in which an eNB or a UE has a plurality of transmit/receive antennas capable of forming an AAS based 3-dimensional beam.

In the legacy LTE(-A) system, a UE reports, to a serving eNB of the UE, a precoding matrix indicator (PMI) appropriate for a DL channel of the UE, a rank indicator (RI), and a channel quality indicator (CQI) as channel information when the RI and the PMI are applied. When a UE selects a PMI appropriate for the UE in a codebook, if a target includes all consecutive PMIs, there is no problem. However, in reality, the UE inevitably selects a PMI among a plurality of PMIs in the codebook, and thus a problem inevitably arises in terms of granularity of the codebook. If the problem does not arise in terms of the granularity, a system including a plurality of antennas can inevitably exhibit good performance based on basic formula of a multiple antenna (multiple-input multiple-output (MIMO)). However, a codebook used in the current system has a problem in terms of granularity, and thus it is not always advantageous to use all antennas of an eNB.

In addition, the UE needs to select a PMI that is most appropriate for a channel from the eNB. In this regard, as the number of antennas that are currently used by the eNB is reduced, a PMI that is more appropriate for the UE can be present. Thus, the present specification proposes a feedback scheme for a request for reducing an antenna in order to find a more appropriate codebook.

The present specification proposes a method in which a UE is requested to select some of antennas of an eNB in consideration of the granularity of a codebook during selection of PMI such that the eNB reduces the number of antennas. In this specification, the expression that some of antennas are not used indicates that power of antennas designated when the eNB transmits UE-specific information is zero(0). Accordingly, the designated antennas can be used for transmission of information such as cell-specific information, for example, channel state reference signal. However, the designated antennas may not be used for transmission of cell-specific information according to determination of the eNB.

Figure 9:
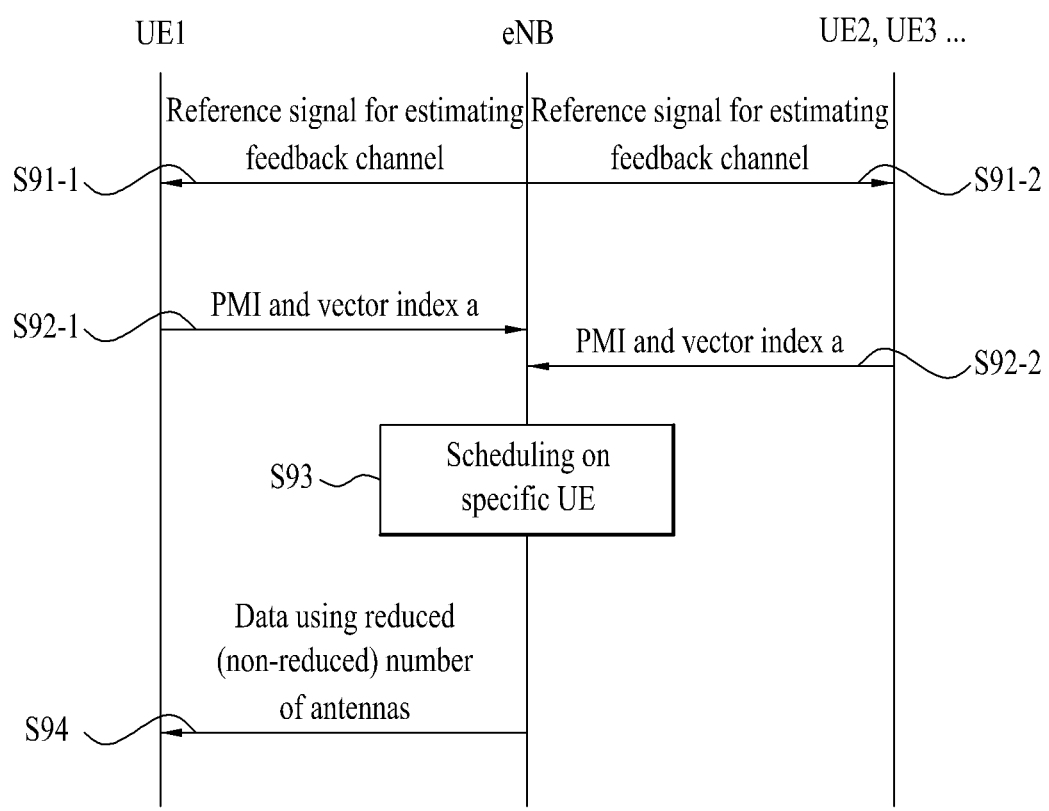
FIG. 9 is a diagram illustrating an operation according to embodiment(s) of the present invention.

FIG. 9 is a diagram illustrating an operation according to an embodiment of the present invention.

According to an embodiment of the present invention, a UE may indicate information of all antennas that the UE does not want a serving eNB to use and select an antenna in some subsets in consideration of overhead. According to the selected antenna information, "antenna selection codebook" for antenna selection may be defined. The UE may feedback the antenna information that is most appropriate for a current channel state to the eNB through the antenna selection codebook. For example, when information about antennas is indicated, if the number of antennas of the eNB is N, N bits are necessary. In this case, the antenna selection codebook may be represented as $a=[a_1, a_2, \ldots, a_N]$, and $a_i$ as a value of an $i^{th}$ antenna in vector 'a' may have 0 or 1. '0' means that an antenna is not used, and '1' means that an antenna is used. $a=[0, 0, \ldots, 0]$ indicating that all antennas are not used is not used. Here, the number of cases of antenna selection indicated by as the antenna selection codebook may be a total of $2^N-1$, and the UE may feedback one value of these. That is, the UE may feedback an index indicating one of the antenna selection codebook.

In this case, in order to reduce N-bit overhead, an entire set of vector 'a' may not be used and an antenna may be selected and fed back in some subsets. As a simple example, when 1-bit feedback as antenna information of the eNB is possible for the eNB including 8 antennas, two of $a0=[1, 1, 1, 1, 1, 1, 1, 1]$ and $a1=[1, 1, 1, 0, 0, 0, 0]$ are defined as the antenna selection codebook and have index 0 and 1, respectively. The UE may feedback index 0 or 1.

Information about a set used by the antenna selection codebook may be pre-promised or exchanged between the eNB and UEs via RRC signaling.

According to an embodiment of the present invention, as the number of antennas used by the eNB is reduced, it may be difficult to define a PM to be used by the eNB and the UE. For example, when the eNB uses four antennas, if the UE requests to use three antennas, the eNB needs to select a PM in a codebook appropriate for the three antennas for the UE. However, since the PM or the codebook is not supported in the current LTE, the PM or the codebook needs to be randomly formed and used.

According to an embodiment of the present invention, for this situation, a legacy codebook is adjusted or converted using two methods.

In a first method, the eNB reduces the number of antennas to be used up to the number of antennas in which a codebook used in a wireless system used by the UE is present. For example, since a codebook that considers only the number of 1, 2, 4, or 8 antennas is present in the current LTE(-A), the antenna selection codebook a or a subset thereof may be generated accordingly. In other words, the number of antennas may be reduced such that the number of antennas of the eNB is one of 1, 2, 4, and 8. In other words, the reduced number of antennas may be limited to a divisor of the number (in general, the number of all transmission antennas of the eNB) of antennas currently used by the eNB.

Thus, even if the eNB uses only some antennas according to request of the UE, precoding may be applied using the legacy codebook. The UE may feedback the PMI and index of the antenna selection codebook appropriate for the UE to the eNB in consideration of the legacy codebook, and the eNB may determine a precoding matrix using the PMI and the index, perform precoding based on the determined precoding matrix, and transmit the precoded signal to the UE.

In this case, a value based on which the UE wants the eNB to perform procoding may be represented according to Equation 12 below.

$$PM_{new}=A_1 \times PM_1 \quad \text{[Equation 12]}$$

In Equation 12, a new procoding matrix $PM_{new}$ is represented by product of antenna selection matrix $A_1$ as information about the reduced number of antennas and $PM_1$ corresponding to the reduced number (i.e. 2) of the antennas selected in the legacy codebook for PM. That is, according to the present embodiment, in order to reduce the number of antennas of the eNB to two from four, $A_1$ may be a matrix for selecting two antennas among four antennas and $PM_1$ may be PM appropriate for a current channel state in the legacy codebook for two antennas. Here, the antenna selection matrix $A_1$ is a matrix from which a column with a vector '0' is removed in diag(a). In addition, diag(a) refers to a diagonal matrix having elements of a vector 'a' as diagonal values. For example, if vector 'a'=[1, 0, 0, 1] is given, the antenna selection matrix $A_1$ may be represented as follows $$A_1 = \begin{bmatrix} 1 & 0 \\ 0 & 0 \\ 0 & 0 \\ 0 & 1 \end{bmatrix} \quad \text{[Equation 13]}$$

The antenna selection matrix $A_1$ indicates that the eNB has four antennas and the UE requests to currently use only antennas #1 and #4. In Equation 13 above, the antenna selection matrix $A_1$ has two columns so as not to use antennas #1 and #4 of the UE. Thus, as described above, it may be possible to change the size of columns of the antenna selection matrix $A_1$ so as to select $PM_1$ in the codebook PM with various sizes according to the number of selected antennas. As a result, the eNB may use the reduced number of antennas using $PM_{new}$ and may also apply precoding appropriate for the reduced number of antennas.

It is assumed that the legacy codebook is designed appropriately for power in the aforementioned first method. In other words, this means that all codebooks have a fixed value of $E\{tr(PM^H \times PM)\}=\alpha$. Here, tr(–) refers to "trace", i.e. the total of diagonal elements of a matrix, and $E\{\cdot\}$ refers to an average value. When $\alpha$ is varied according to a codebook, normalization can be applied.

In a second method, an antenna selection codebook is a generated irrespective of a codebook used in a wireless system used by a UE. That is, the number of antennas to be reduced may be limited so as not to be a divisor of the number (in general, the number of all transmission antennas of the eNB) of antennas that are currently used by the eNB.

In this case, when the eNB reduces the number of antennas according to request of the UE, a new codebook to be used is required. In this case, the legacy codebook is corrected according to the reduced number of antennas to create the new codebook. Thus, the codebook corrected while reducing the number of antennas may include a more appropriate PM than the legacy codebook, which facilitates overcoming of the aforementioned problem in terms of granurality.

The codebook correction method as the first method will now be described in more detail. Elements of PM connected to antennas that are not used according to request of the UE in a codebook according to the number of antennas that are currently used by the eNB may be configured as '0' and normalization may be applied to the reduced power. Needless to say, in consideration of power of each antenna, antennas may be used without normalization. The reduced number of antennas and PM may be represented by one equation as follows.

$$PM_{new} = M \times A_2 \times PM_2 \quad \text{[Equation 14]}$$

The new precoding matrix $PM_{new}$ is represented by product of antenna selection matrix $A_2$ and $PM_2$ selected in consideration of the reduced number (i.e. 3) of antennas of the eNB in a codebook according to the number (i.e. 4) of antennas of the eNB. Here, $A_2$ is simply represented as diag(a). M is a normalization value and normalization may be applied through M or M may be set to '1'. M that is not '1' may be calculated according to the following equation.

$$M = \sqrt{\frac{E\{tr(PM_2^H \times PM_2)\}}{E\{tr(PM_2^H \times A_2^H \times A_2 \times PM_2)\}}} \quad \text{[Equation 15]}$$

As described above, when information about the reduced number (i.e. indicating $A_2$) of antennas and PMI (indicating $PM_2$) are associated and fed back, if the eNB does not accept a request for limiting antennas, since $PM_2$ received by the eNB is associated with the reduced number of antennas, PM is also unnecessary information and it may be difficult to apply precoding by the eNB. To prevent this, the UE may assume that the number of antennas of the eNB is not reduced and may also feedback the selected PMI together.

As described above, the eNB may receive feedback information about antennas and PMI and then reduce the number of antennas for DL transmission or regard the feedback information. In this case, the eNB may reduce the number of antennas for transmission without notifying the UE of the reduced antennas.

However, a reference signal for channel feedback, that is, channel state information-reference signal may be transmitted with respect to the non-reduced number of antennas, and thus UEs that are currently present in a cell of the eNB may estimate all channels based on the reference signal and feedback the antenna number and PMI appropriate for the respective UEs. In addition, the UE may feedback feedback information such as the RI and the CQI together and then the eNB may perform scheduling based on the feedback information. Then, according to antenna information requested by a selected UE, the eNB may reduce the number of antennas or disregard the information.

Alternatively, the eNB may notify UEs of information about the reduced number of antennas. In this case, the UEs may be notified of the reduced number of antennas through configuration information about a reference signal for channel feedback such as CSI-RS configuration.

The aforementioned embodiment of the present invention may be applied according to a request of the UE and alternatively applied so as not to use some antennas in order to save power by the eNB as necessary. In this case, the aforementioned method for reducing a legacy codebook is used. Elements of PM associated with antennas that are not used to save power in a codebook according to the number of antennas that are currently used by the eNB are configured as '0', which is for power saving and thus normalization is not applied. In this case, UEs in a cell may be notified of the reduced number of antennas through configuration of a reference signal for channel feedback such as CSI-RS configuration.

Second Embodiment

According to an embodiment of the present invention, in order to reduce inference from adjacent cells, the number of antennas to be used by the adjacent cells may be limited. In the proposed method, a UE may indicate whole antenna information that is not desired to be used by the adjacent cells, or the antenna information may be selected in some subsets in consideration of overhead. The antenna information may be fed back to a serving cell by the UE using the aforementioned antenna selection vector 'a' and transmitted to the adjacent cells from the serving cell.

According to an embodiment of the present invention, when the number of antennas to be used in the adjacent cells is reduced, it may be difficult to define PM to be used in the adjacent cells. According to the present invention, for this situation, a codebook may be adjusted using the aforementioned two methods.

Third Embodiment

Figure 10:
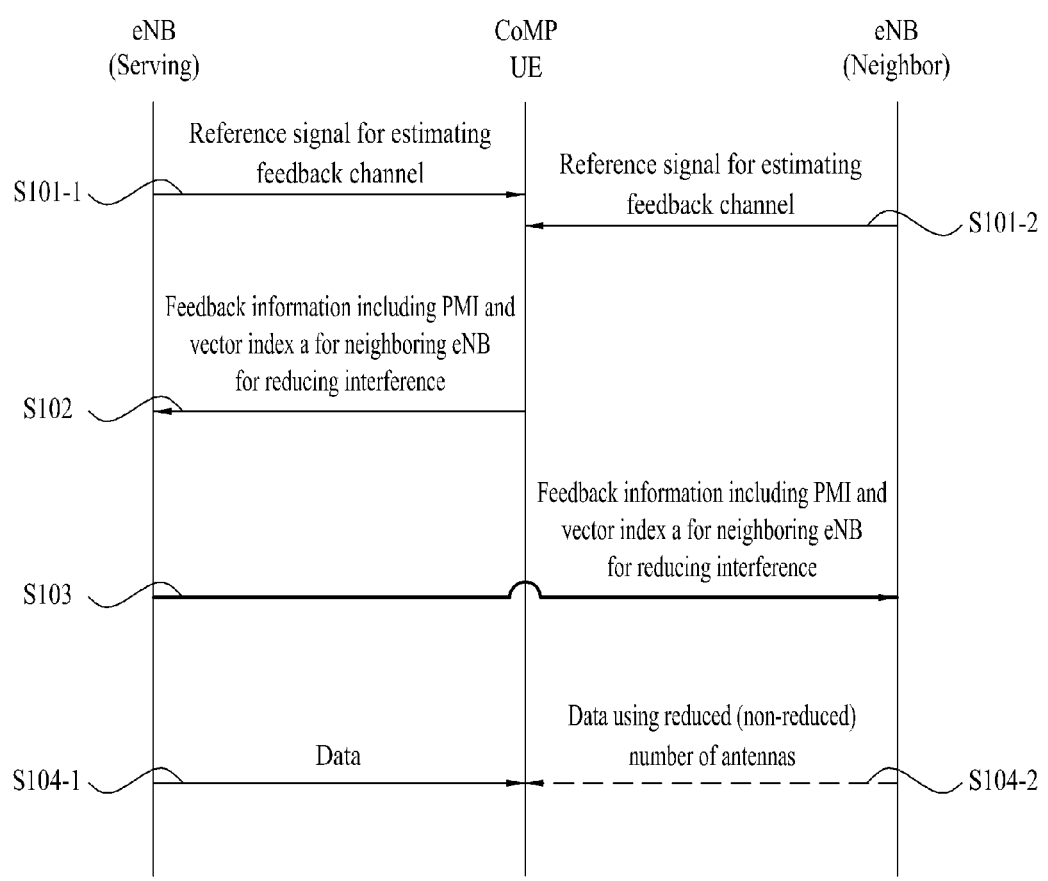
FIG. 10 is a diagram illustrating an operation according to embodiment(s) of the present invention.

In addition, an embodiment of the present invention can also be applied in a CoMP method. In a CS/CB method, a UE that participates in CoMP may limit a beamforming vector or a transmission PM of adjacent cells to reduce interference from the adjacent cells and to enhance reception performance from a serving cell. FIG. 10 is a diagram illustrating an operation performed in a CoMP method according to an embodiment of the present invention.

A proposed method to be applied in a CoMP situation in an embodiment of the present invention can be basically used together with a method for limiting a PM to be used by adjacent cells. There are three representative methods for limiting a PM. A first method is a method for feeding back a worst PMI that is not desired to be used by adjacent cells, and a second method is a method for feeding back a recommended PMI that is desired to be used adjacent cells. A last method is a method for designating a specific subset in a codebook, feeding back a bitmap indicator for PMs in the subset, and individually determining whether the PMs are desired to be used by the adjacent cells or not, in order to indicate a PM that is desired to be used by adjacent cells. An embodiment of the present invention may be used together with the second method or the last method as follows.

According to the present invention, the case in which the second method for feeding back the recommended PMI that is desired by adjacent cells is used together will now be described. First, a CoMP UE selects PMIs with weakest interference with respect to all matrices or vectors included in a set of the antenna selection vector 'a' and then compares interferences by each vector 'a' and the selected PMI. Then a vector 'a' and PMI that are most appropriate to reduce interference are fed back. An eNB of an adjacent cell may reduce the number of used antennas based on the fed back information according to Equation 12 or 14 above and then perform precoding on a UE of the adjacent cell.

According to the present invention, in order to indicate the recommended PMI that is desired to be used by adjacent cells, the case in which the third method for designating a specific subset in a codebook and individually indicating PMIs in the subset is used together will now be described. A CoMP UE determines whether PMs in a subset of a codebook are desired to be used with respect to all matrices or vectors included in a set of the antenna selection vector 'a'. In addition, information about each vector 'a' and information about a PM corresponding thereto are compared and information about a vector 'a' and information about a PM for reducing interference are fed back. An eNB of the adjacent cell may select an appropriate PM among fed back PMs, reduce the number of used antennas using Equation 12 or 14 above, and then perform precoding on a UE of the adjacent cell.

As such, when information about the PM is fed back in association with the PMI in a CoMP environment, if an adjacent cell does not accept a request for limiting antennas, since information for limiting PMs of the adjacent cell is associated with information about the reduced number of antennas, the PM is also unnecessary information. To prevent this, the UE may assume that the number of antennas of the adjacent cell and may also transmit information for limiting a selected PM together.

As described above, the adjacent cell may receive feedback information for limiting an antenna and PMI and then adjust the number of antennas of the adjacent cell. In this case, an eNB of the adjacent cell may notify UEs in the adjacent cell of information about the reduced number of antennas through configuration of a reference signal for channel feedback, such as a CSI-RS configuration of a current LTE(-A) system.

Third Embodiment

Figure 11:
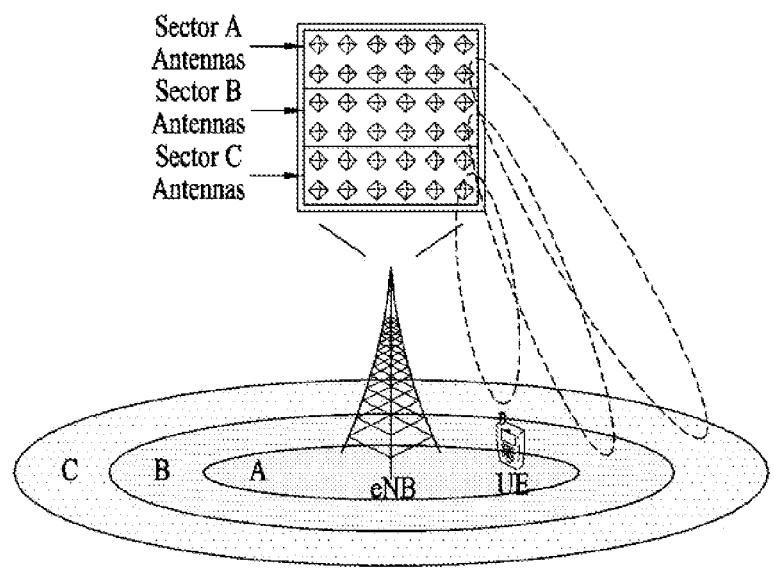
FIG. 11 is a diagram illustrating an operation according to embodiment(s) of the present invention.

An embodiment of the present invention may also be used in an eNB using a 2-dimension active antenna system (2D-AAS). When the 2D-AAS is used, it may be possible to adjust a legacy horizontal beam in a 1D-AAS and to also adjust a vertical beam. Thus, like in a 2D-AAS illustrated in FIG. 11, some antennas may constitute one sector. In FIG. 11, twelve upper antennas (hereinafter, referred to as "antenna A group") constitute sector A, twelve intermediate antennas (hereinafter, referred to as "antenna B group") constitute sector B, and twelve lower antennas (hereinafter, referred to as "antenna C group") constitute sector C. Each sector supports UEs therein.

Referring to FIG. 11, a UE positioned in sector A is very adjacent to sector B and thus is exposed to interference due to sector B. In this case, like CoMP CS/CB of the current LTE (-A) system, when the antenna A group and the antenna B group cooperate with each other and support a UE of sector A, the antenna B group may support a UE of the antenna B group while reducing interference to the UE of sector A. In this case, in order to more appropriately control interference from sector B (or the antenna B group), some antenna of the antenna B group may be turned off and operated, and thus the reduced number of antennas of the antenna B group may facilitate overcoming of the problem of the granularity of a codebook due to the conventional fixed number of antennas.

The present invention may be used in a 3D-MIMO situation using the 2D-AAS. First, sectors that cooperate with each other may be classified into a "serving sector" that supports a UE and an "adjacent sector" that controls only interference to the serving sector. In the proposed method, the UE may indicate whole information about antennas that are not desired to be used by the adjacent sector and may selectively indicate information in some subsets in consideration of overhead. The antenna information may be fed back to the serving sector by the UE using the aforementioned antenna selection vector 'a' and transmitted to the adjacent sector.

According to an embodiment of the present invention, when the number of antennas to be used in the adjacent sector is reduced, it may be difficult to define a PM to be used in the adjacent sector. According to the present invention, for this situation, a codebook may be adjusted using the aforementioned two methods.

In a 3D-MIMO environment, a method proposed according to the present invention may be basically used together with a method for limiting a PM to be used by the adjacent sector. Two methods that can be used in this case will now be described.

According to an embodiment of the present invention, the case in which a method for feeding back recommended PMI that is desired to be used by the adjacent sector and a method for reducing the number of antennas of the adjacent sector is used together will now be described. First, a UE served with cooperation of sectors A and B the aforementioned all matrices or vectors.

The UE may select PMIs with weakest interference with respect to all vectors included in a set of the antenna selection vector 'a', compare interferences by each vector 'a' and the selected PMI, and then feedback a vector 'a' and PMI that are most appropriate to reduce interference to an eNB. The eNB may reduce the number of used antennas based on the fed back information according to Equation 12 or 14 above with respect to an antenna group that is charge of the adjacent sector and then perform precoding on the UE of the adjacent sector.

According to the present invention, in order to indicate a PM that is desired to be used by the adjacent sector, the case in which a method for designating a specific subset in a codebook and individually indicating PMIs in the subset is used together will now be described. A UE served with cooperation of sectors A and B determines whether PMs in a subset of a codebook are desired to be used with respect to all vectors included in a set of the antenna selection vector 'a'. In addition, the UE may compare information of each vector 'a' and information about a PM corresponding thereto and transmit the information about a vector 'a' and PM for reducing interference to the eNB. The eNB may select an appropriate PM among the fed back PMs, reduce the number of used antennas according to Equation 12 or 14, and then perform precoding on the UE of the adjacent sector, with respect to an antenna group that is charge of the adjacent sector.

As such, when information about the reduced number and PMI are associated and fed back in a 3D-MIMO environment, if a request for limiting the antenna with respect to the adjacent sector is not accepted, information for limiting a PM of the adjacent sector is associated with the reduced number of antennas, and thus the PM is also unnecessary information. To prevent this, the UE may assume that the number of antennas of the eNB is not reduced and may also transmit information for limiting a selected PM.

As described above, the eNB may receive feedback information for limiting antennas and PMI and then adjust the number of antennas of the adjacent cell. In this case, the eNB may notify UEs in the adjacent sector of information about the reduced antennas through a configuration of a reference signal for channel feedback such as a CSI-RS configuration of the current LTE(-A) system.

In addition, an embodiment of the present invention may also be used in a 3D-MIMO situation.

In the 3D-MIMO situation, a plurality of antennas in an eNB to which a 2D-AAS is applied is charge of one area. In this case, when the number of the antennas that are charge of one area is 'N', UEs in the one area may perform channel estimation on N channels (channel estimation is performed on more channels as necessary according to the number of antennas of the UE) and feedback a channel estimation value to the eNB. In this case, in order to ensure good performance of the N antennas, so many channel feedback information (e.g. if N=64, feedback information for at least 64 channels is required) may be required, thereby causing overhead that cannot be coped with a system.

However, according to an embodiment of the present invention, the overhead can be reduced. First, with respect to antennas that are charge of one area, a maxim number of antennas in the above defined antenna selection codebook may be defined as $N_M$ and designated. In addition, the antenna selection codebook may be formed according to $N_M$. In other words, a vector a in the antenna selection codebook may have $N_M$ elements or less as '1'. All vectors 'a' that satisfy the maximum value may be used, or a subset of a set of all vectors 'a' may be designated and used, as described above.

Information about a set (including information about $N_M$) included in the antenna selection codebook may be pre-promised or exchanged between an eNB and UEs via RRC signaling.

Figure 12:
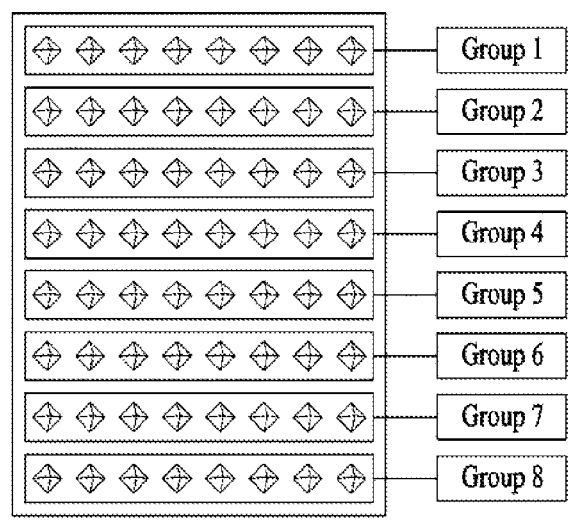
FIG. 12 is a diagram illustrating an operation according to embodiment(s) of the present invention.

In this case, an antenna that is charge of one area may be divided into a plurality of groups. The UE may select one group among the groups or feedback information about an antenna to be used in the selected group through a vector 'a'. For example, in FIG. 12, N=64 antennas assume $N_M$=8 and is divided into eight groups. In this case, the UE may select one group through the vector 'a' or feedback information about selection of some antennas in the group.

When an antenna is divided into groups, $N_M$ may not be a divisor of the number, N of antennas that are charge of one area. Thus, when the groups are formed, the groups may share the same antennas.

To this end, when the present invention is used, the eNB needs a codebook according to the number of a plurality of antennas in order to use a PM. According to the present invention, for this situation, a codebook may be adjusted using the aforementioned two methods.

As described above, the eNB may receive information about antennas and feedback information about PMI and then select an appropriate antenna. In this case, the eNB may select an antenna without notifying the UE of information about the selected antenna. However, since a reference signal for channel feedback is transmitted through all antennas, UEs in cell coverage of a current eNB may estimate all channels based on the reference signal and feedback PMI and information about antennas appropriate for the UEs. In addition, the UE may feedback feedback information such as the RI and the CQI together and then the eNB may perform scheduling based on the feedback information.

Figure 13:
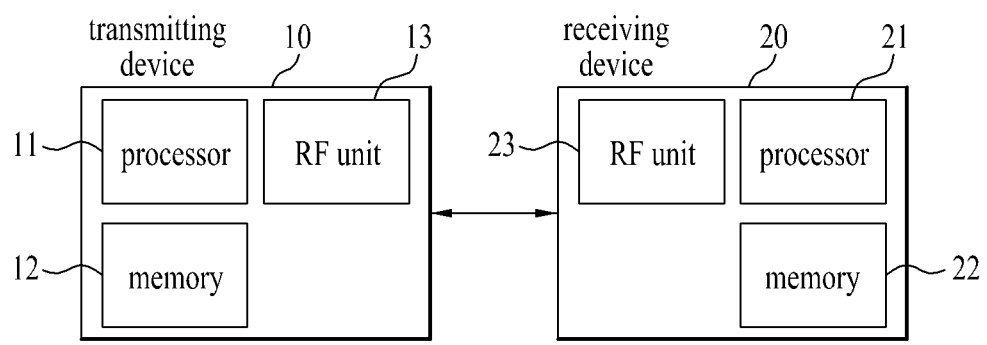
FIG. 13 is a block diagram of an apparatus for embodying embodiment(s) of the present invention.

FIG. 13 is a block diagram showing components of a transmitting device 10 and a receiving device 20 for performing the embodiments of the present invention. The transmitting device 10 and the receiving device 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signals. The memories 12 and 22 may be used as a buffer. The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitting device 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiving device in the form of one or more layers. For frequency up-conversion, the RF unit 13 may include an oscillator. The RF unit 13 may include Nt (Nt being a positive integer) transmit antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitting device 10 in uplink and operates as the receiving device 20 in downlink. In the embodiments of the present invention, an eNB operates as the receiving device 20 in uplink and operates as the transmitting device 10 in downlink.

The transmitting device 10 and/or the receiving device 20 may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

[Industrial Applicability]

The present invention may be used for a wireless communication apparatus such as a user equipment (UE), a relay and a base station (BS).

The invention claimed is:

1. A method for receiving a downlink signal by a user equipment (UE) in a wireless communication system, the method comprising:

transmitting an antenna selection index for selecting M antennas among N antennas of a specific base station (BS), where N>M and both N and M are positive integers, and a precoding matrix indicator (PMI) appropriate for the M antennas to a serving BS; and receiving downlink signal which is precoded using a precoding matrix determined based on the antenna selection index and the PMI, from the specific BS, wherein the antenna selection index indicates one of all antenna selection vectors for selecting at least one antenna among the N antennas of the specific BS or an antenna selection vector included in an antenna selection codebook comprised of subsets of the all antenna selection vectors, wherein, when M is a divisor of N, a precoding matrix ($PM_{new}$) is determined according to $PM_{new} = A1 \times PM1$, and where $A_1$ is a matrix obtained by removing columns of zero (0) vectors from diag(a), diag(a) is a diagonal matrix having elements of antenna selection vector (a) indicated by the antenna selection index as diagonal elements, and $PM_1$ is a precoding matrix indicated by the PMI appropriate for the M antennas.

2. The method according to claim 1, wherein the transmitting comprises transmitting PMI appropriate for the N antennas to the serving BS.

3. The method according to claim 1, wherein, when M is not a divisor of N, a precoding matrix ($PM_{new}$) is determined according to $PM_{new} = M \times A_2 \times PM_2$, where $A_2$ is diag(a), diag(a) is a diagonal matrix having elements of antenna selection vector (a) indicated by the antenna selection index as diagonal elements, $PM_2$ is a precoding matrix indicated by the PMI appropriate for the M antennas, and M is a normalization value.

4. The method according to claim 3, wherein $$M = \sqrt{\frac{E\{tr(PM_2^H \times PM_2)\}}{E\{tr(PM_2^H \times A_2^H \times A_2 \times PM_2)\}}},$$

where E { } is an average value, tr() is the sum of diagonal elements, and $^H$ is Hermit matrix.

5. A method for transmitting a downlink signal by a base station (BS) in a wireless communication system, the method comprising:

receiving an antenna selection index for selecting M antennas among N antennas of the BS, where N>M and both N and M are positive integers, and a precoding matrix indicator (PMI) appropriate for the M antennas from a user equipment (UE) or another BS;

determining a precoding matrix based on the antenna selection index and the PMI; and transmitting downlink signal precoded using the determined precoding matrix to the UE, wherein the antenna selection index indicates one of all antenna selection vectors for selecting at least one antenna among the N antennas of the BS or an antenna selection vector included in an antenna selection codebook comprised of subsets of the all antenna selection vectors, wherein, when M is a divisor of N, a precoding matrix ($PM_{new}$) is determined according to $PM_{new} = A1 \times PM1$, and where $A_1$ is a matrix obtained by removing columns of zero (0) vectors from diag(a), diag(a) is a diagonal matrix having elements of antenna selection vector (a) indicated by the antenna selection index as diagonal elements, and $PM_1$ is a precoding matrix indicated by the PMI appropriate for the M antennas.

6. The method according to claim 5, wherein the receiving comprises receiving PMI appropriate for the N antennas from the UE or the another BS.

7. The method according to claim 5, wherein, when M is not a divisor of N, a precoding matrix ($PM_{new}$) is determined according to $PM_{new} = M \times A_2 \times PM_2$, where $A_2$ is diag(a), diag(a) is a diagonal matrix having elements of antenna selection vector (a) indicated by the antenna selection index as diagonal elements, $PM_2$ is a precoding matrix indicated by the PMI appropriate for the M antennas, and M is a normalization value.

8. The method according to claim, 7

$$M = \sqrt{\frac{E\{tr(PM_2^H \times PM_2)\}}{E\{tr(PM_2^H \times A_2^H \times A_2 \times PM_2)\}}},$$

where E { } is an average value, tr( ) is the sum of diagonal elements, and $^H$ is Hermit matrix.

9. A user equipment (UE) configured to receive a downlink signal in a wireless communication system, the UE comprising:

a radio frequency (RF) unit; and a processor configured to control the RF unit, wherein:
the processor is configured to transmit an antenna selection index for selecting M antennas among N antennas of a specific base station (BS), where N>M and both N and M are positive integers and a precoding matrix indicator (PMI) appropriate for the M antennas to a serving BS, and to receive downlink signal which is precoded using a precoding matrix determined based on the antenna selection index and the PMI, from the specific BS; and wherein the antenna selection index indicates one of all antenna selection vectors for selection of at least one antenna among the N antennas of the specific BS or an antenna selection vector included in an antenna selection codebook comprised of subsets of the all antenna selection vectors, wherein, when M is a divisor of N, a precoding matrix ($PM_{new}$) is determined according to $PM_{new} = A1 \times PM1$, and where $A_1$ is a matrix obtained by removing columns of zero (0) vectors from diag(a), diag(a) is a diagonal matrix having elements of antenna selection vector (a) indicated by the antenna selection index as diagonal elements, and $PM_1$ is a precoding matrix indicated by the PMI appropriate for the M antennas.

10. A base station (BS) configured to receive a downlink signal in a wireless communication system, the BS comprising:
a radio frequency (RF) unit; and
a processor configured to control the RF unit, wherein:
the processor is configured to receive an antenna selection index for selecting M antennas among N antennas of the BS, where N>M and both N and M are positive integers, and a precoding matrix indicator (PMI) appropriate for the M antennas from a user equipment (UE) or another BS, to determine a precoding matrix based on the antenna selection index and the PMI, and to transmit downlink signal precoded using the determined precoding matrix to the UE; and wherein the antenna selection index indicates one of all antenna selection vectors for selection of at least one antenna among the N antennas of the BS or an antenna selection vector included in an antenna selection codebook comprised of subsets of the all antenna selection vectors, wherein, when M is a divisor of N, a precoding matrix ($PM_{new}$) is determined according to $PM_{new} = A1 \times PM1$, and where $A_1$ is a matrix obtained by removing columns of zero (0) vectors from diag(a), diag(a) is a diagonal matrix having elements of antenna selection vector (a) indicated by the antenna selection index as diagonal elements, and $PM_1$ is a precoding matrix indicated by the PMI appropriate for the M antennas.

* * * * *